Figure 1:
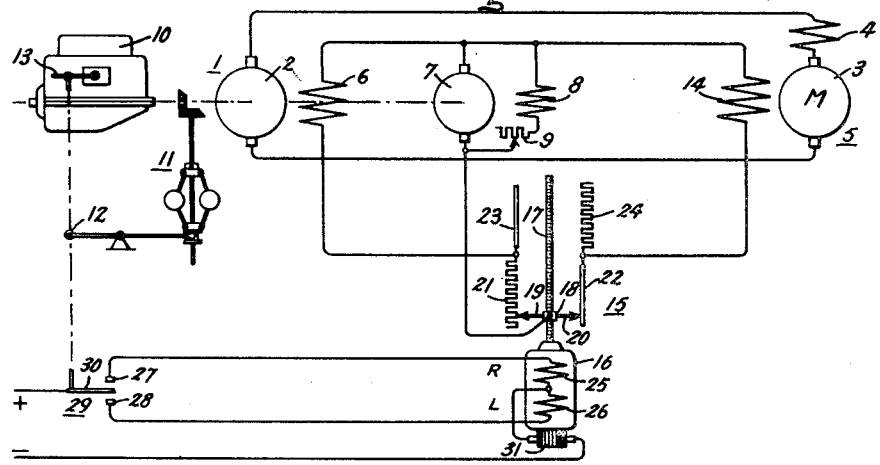

March 14, 1950     G. R. HIGGS     2,500,753
PRIME MOVER ELECTRIC DRIVE CONTROL SYSTEM
Filed July 5, 1947

Inventor:
George R. Higgs,
by Purnell & Mack
His Attorney.

Patented Mar. 14, 1950

2,500,753

UNITED STATES PATENT OFFICE 2,500,753

PRIME MOVER ELECTRIC DRIVE CONTROL SYSTEM

George R. Higgs, Hale, England, assignor, by mesne assignments, to General Electric Company, a corporation of New York Application July 5, 1947, Serial No. 759,051
In Great Britain July 30, 1945

Section 1, Public Law 690, August 8, 1946
Patent expires July 30, 1965

8 Claims. (Cl. 318—147)

My invention relates to control systems for a prime mover driven electric power apparatus, and more particularly to the control of electric drive systems for self-propelled vehicles of the engine driven generator type.

In power driven vehicles having a prime mover and an electrical power transmission comprising an engine driven generator supplying one or more traction motors, it is common practice to provide for the automatic control of the load on the engine by means responsive to changes in engine speed, which in turn reflects changes in engine loading. In accordance with this practice, when the generator is of the shunt or compound type with separate excitation, the field excitation is usually controlled by a regulating resistance which, in turn, is operated in response to or in unison with the fuel control apparatus for the prime mover. Thus, any variation of torque on the prime mover from a selected speed-torque setting results in a change in prime mover speed, thereby producing a corrective adjustment in fuel supply to the engine and also adjusting the generator voltage for restoring the load on the prime mover to the preselected value.

The range of vehicle speed under which full power can be drawn from the prime mover is limited by the full power range of voltage applied by the generator to the traction motors which is, in turn, also limited by the full power current range of both generator and motors. The maximum current permissible in the electrical machinery is directly related to machine size; accordingly, the full load range of the machinery is directly related to size, thereby requiring substantially larger electrical machines where it is desired to take advantage of the full load power over a wide speed range. One method of extending the full load speed range is by reduction of the motor excitation by manual control, which is subject to the disadvantage that the operator may not be fully aware of the present operating condition of the prime mover, and that the manual control might be effected more or less indiscriminately, thereby subjecting the engine, at least temporarily, to overloading and underloading.

It is, therefore, an object of my invention to extend the full load speed range of a mobile power plant with respect to the capacity of the electric machinery without appreciably overloading or underloading the power plant.

It is a further object of my invention to provide an improved automatic regulating system for a prime-mover driven, electrically-propelled vehicle.

It is a still further object of my invention to provide improved automatic control means for simultaneously and progressively controlling both motor and generator excitation in response to prime mover speed and load.

In a preferred embodiment of my invention, the variation in motor field excitation may be effected by the same means that are utilized for controlling generator field excitation. For example, the generator field excitation is adjusted by a servo-operated field rheostat in which the servomotor is controlled by the engine governor or an equivalent speed responsive device. By appropriate modification, the servo-operated rheostat may be arranged to adjust the motor excitation after completion of its operation to increase the generator excitation to the maximum value. By combining the control of both generator and motor field excitation in a single device, the proper sequence of excitation control is preserved and the danger of reducing motor field while the generator field is underexcited, which might occur in the case of manual operation, is eliminated.

In a modification of my invention, sectionalized resistances arranged in shunt relationship with the motor series field, in the case where a series traction motor is employed, may be used for effectively varying the field excitation of the series motor. However, the same operating sequence is maintained; that is, the generator excitation is increased while the motor field excitation is maintained constant at maximum value, and upon the attainment of maximum generator field excitation, the servo-operated rheostat continues the operation to decrease motor field excitation while maintaining the generator field excitation at the maximum value.

While the system has been briefly described with reference to a single traction motor, it will be obvious that it is equally applicable to any desired number of traction motors, and that the load control part of the system may be arranged to function with types of prime movers other than internal combustion engines, such as steam or gas turbines.

Figure 2:
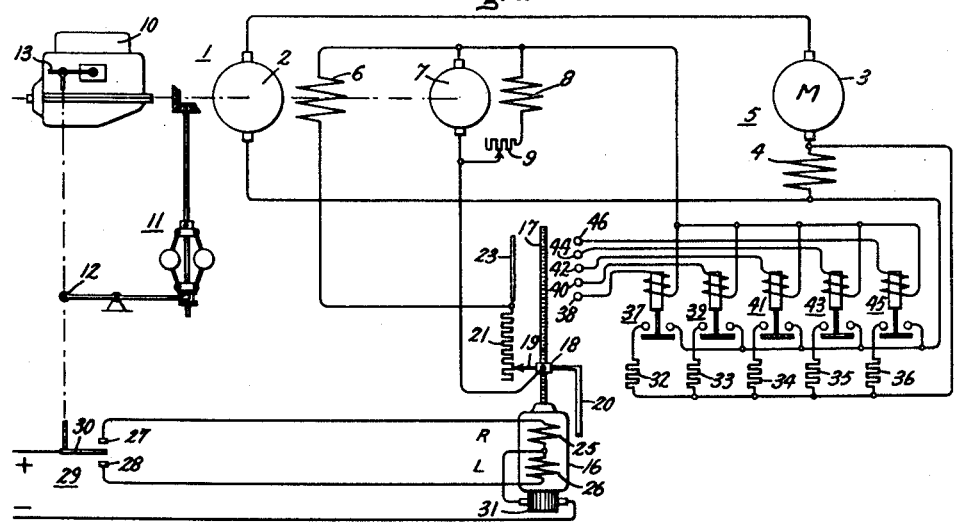
Figure 3:
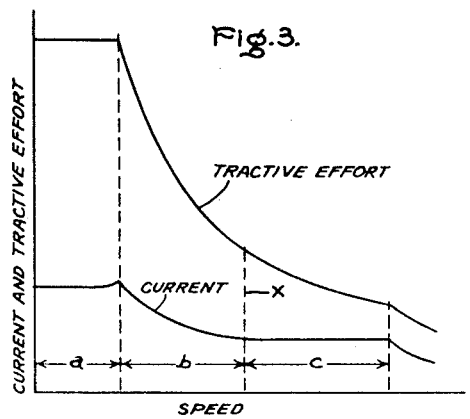

For a more complete understanding of my invention, reference should now be had to the accompanying drawing in which Fig. 1 shows in simplified diagrammatic form a preferred embodiment of my invention; Fig. 2 is an alternative arrangement in which sectionalized resistors are used in shunt with the motor series field; and Fig. 3 shows certain operating characteristics of the system shown in Fig. 1.

Referring now to Fig. 1, I have shown a direct current generator 1 having its armature 2 connected in loop circuit relationship to the armature 3 and series field winding 4 of a D.-C. traction motor 5. The generator 2 is provided with a separately excited field winding 6 which is supplied with energy from the direct connected exciter 7. For controlling the voltage of the exciter 7, a shunt field winding 8 and an adjusting resistance 9 are provided. The main generator 2 and the exciter 7 are mechanically connected to and driven by a prime mover 10, which, as shown, may be of the internal combustion type and is equipped with a speed responsive governor shown diagrammatically as a flyball mechanism at 11. The speed responsive governor 11 is mechanically arranged, through suitable linkage 12, so that the fuel adjustment lever 13 of the internal combustion engine will be operated in the proper direction to increase engine fuel when actuated in an upward direction by the speed responsive governor 11 and linkage 12.

The traction motor 5 is also provided with a separately excited field winding 14 which receives energy from the exciter 7. A motor driven regulating rheostat 15 is employed for varying both motor and generator field currents and consists of a reversible split field drive motor 16 having an extended threaded shaft 17 which carries the movable resistance contacting element 18. The element 18 is connected to one terminal of the exciter 7 and has two oppositely extending contact fingers 19 and 20. In the field circuit for the main generator 6, the resistance section 21 is arranged so that when the finger 19 of the rheostat is at the extreme low position, as shown, maximum resistance is placed in series with the generator field 6. At the same time, the opposite finger 20 is engaged with a contact strip 22 which completes the circuit from the exciter 7 through the separately excited field winding 14 of the traction motor, and as there is minimum resistance in the field circuit under these conditions, current in the motor field 14 is at a minimum. As the contact member 18 moves upwardly during operation of the motor, it will be seen that the resistance in the generator field circuit 6 is gradually decreased while at the same time the motor field current is maintained constant until the mid-position of the load regulating rheostat is reached. As the movable member 18 progresses upwardly, the left contact finger 19 continues to make contact with the conducting strip 23, which represents a condition of maximum current in the generator field winding 6 since all the resistance 21 has been cut out, and the right contact finger 20 is engaged in contact with the resistance element 24 gradually increasing the resistance in the motor field circuit which reaches a maximum as the movable member 18 approaches the extreme top position.

From the foregoing it will be seen that the motor-operated rheostat 15 is effective in the lower half of its range to vary generator field current while maintaining motor field current constant, and in the upper half of its operating range, as shown, it maintains generator field current constant at maximum value while varying motor field current. The driving motor 16 for the motor-operated rheostat is of the series type, having a pair of opposed field windings 25 and 26 which are connected, respectively, to the "raise" contact 27 and "lower" contact 28 of the switch 29. The movable contact 30 of the switch 29 is mechanically connected by suitable linkage to the operating lever 12 which, in turn, adjusts the engine fuel supply lever 13 in response to the action of the speed responsive governor 11. Thus, when the movable contact member 30 is moved upwardly, representing a decrease in engine speed as indicated by the governor 11, the circuit is closed through the movable contact member 30, the upper contact 27, and the "raise" field winding 25 of the driving motor and thence to the commutator 31 of the motor and back to the other terminal of the source of control power. This energizes the drive motor 16 for rotation in the proper direction to cause the movable member 18 to move upwardly. Conversely, when the engine speed is excessive, the left end of the linkage 12 is actuated downwardly which, in turn, completes the energizing circuit for the drive motor 16, through the movable contact member 30, the "lower" contact 28, "lower" field winding 26 to energize the motor in the opposite direction to drive the movable member 18 downwardly on the threaded drive shaft 17. By means of this arrangement, the resistance in both the motor and generator field circuits is controlled in response to the action of the speed responsive governor 11 and simultaneously with the control of the fuel input device 13 of the prime mover.

The position of the parts as shown in the drawing represents their position at the time of starting of the engine generator power system; that is, there will be a maximum series resistance in the circuit of the generator field winding 6 and a minimum resistance in the circuit of the motor field winding 14. As the speed of the vehicle increases to the value corresponding to the desired power and speed throttle setting, by adjustment of the fuel supply lever 13 under the control of the governor 11, the servo-motor 16 will be operating in an upward direction to increase the excitation of the main generator 1 while maintaining minimum resistance in the circuit of the motor field winding 14. Accordingly, the voltage of the generator will increase, thereby supplying additional current to the motor during the accelerating period. This condition will persist until the vehicle attains a speed corresponding to the desired throttle setting for the engine. In the absence of the load regulating mechanism of my invention, the speed of the vehicle would continue to increase, while the motor current would decrease due to increased counter E. M. F., which conditions corresponds to a decrease in load on the engine and a resulting increase in engine speed. However, when apparatus in accordance with my invention is employed, the speed increase of the engine 10 is detected by the engine governor 11 which adjusts the fuel supply means 12 to restore engine speed to the proper value. In the case under consideration, where speed is increasing due to decreased engine load, the governor will act to reduce the fuel input to the engine and will also actuate the contact member 30 to engage with the lower contact 28, thereby energizing the drive motor 16 to run in a lowering direction and thereby increasing motor field current until a maximum is reached, the member 18 being in mid-position. If engine speed is still excessive, the drive motor 16 will continue operating to further lower the member 18 until generator voltage is reduced to the value where the generator is operating at maximum utilization of engine capacity for that particular speed setting.

In operation of the vehicle on level terrain, corresponding to a steady condition attained in the engine in which the desired speed-load setting is maintained, should the load vary, for instance, due to increased gradient, the excitation of the generator 1 will be automatically increased until maximum generator voltage is obtained. In the absence of the regulating system herein provided, the range of speed of the vehicle would then be limited to a maximum value corresponding to maximum permitted generator voltage. However, with the load control rheostat 15 in operation, vehicle speed may be increased by reduction in motor field current, as the rheostat 15 will operate to insert resistance in the motor field circuit until the maximum permitted load current is obtained. This value of load current together with maximum generator voltage insures that maximum constant load will be drawn from the engine for that particular engine speed setting. In other words, the generator load characteristic is closely matched with the engine output characteristic, resulting in maximum utilization of engine power.

Thus, the range of vehicle speed for which the engine operates at its predetermined power rating is extended, the load regulating system acting in the lower speed range to adjust generator excitation and in the higher speed range to adjust motor excitation. The adjustment is always in a smooth and progressive manner and to an extent just sufficient to restore load on the engine to its predetermined load setting corresponding to the selected speed setting. This can be seen by referring to Fig. 3 which shows the relation of current and tractive effort to speed over the entire speed range. Thus, in the lower speed range, as designated by the area a, constant current is maintained in the generator and motor circuit while the generator voltage is rising. In the intermediate range, as indicated by the area b, constant power is maintained since the current is decreasing and the voltage rising. The line x in Fig. 3 corresponds to the point at which generator excitation has reached its maximum value, and further movement of the motor driven rheostat then causes decrease in motor field current. Thus, the area as indicated by c shows the operation in the upper speed range wherein motor excitation is reduced and generator field excitation maintained constant. This combination results in a constant current-constant voltage relationship obtaining in the main power circuit; consequently, the power output is constant which is the desirable condition, since it thereby closely matches the constant horsepower output characteristics of the internal combustion engine prime mover. Reference to the upper or tractive effort curve in Fig. 3 will show that tractive effort is maintained constant throughout the lower speed range a and decreases progressively and smoothly over the speed ranges b and c.

In the modification shown in Fig. 2, like reference numerals have been applied to similar system components, the main difference between the system of Fig. 2 and that as previously described in connection with Fig. 1 being in the method of controlling motor field excitation in the higher speed ranges. Thus, in Fig. 2, instead of the use of a compound motor having a separately excited field winding, a series motor is utilized having a series field winding 4 and providing a number of resistance sections 32, 33, 34, 35 and 36 which are arranged to be placed in parallel with the series field winding to progressively bypass a greater proportion of the main motor current, thereby reducing the effective field excitation of the traction motor 5. For example, the resistance 32 is inserted in parallel with the field winding 4 when the motor-operated contact arm 20 reaches the midpoint position wherein the arm 20 makes contact with the contact finger 38, thereby energizing the circuit closing relay 37 and inserting the resistance 32 in parallel with field winding 4. As the motor-operated contact member 18 progresses upwardly, it will be seen that the contact fingers 40, 42, 44 and 46 are successively engaged by the contact member 20, thereby closing the circuit to successively energize their respective circuit closing relays 39, 41, 43 and 45. The successive closure of these relays, in turn, inserts the resistance sections 33, 34, 35 and 36, respectively, in parallel relationship with the motor field winding. Thus, when the motor-operated rheostat is in the maximum upward position all relays will be energized with the result that all resistance sections 32—36, both inclusive, will be placed in parallel with each other and with the series field winding 4. This results in a condition of minimum field excitation for the motor corresponding to maximum motor field current. In all other respects the operation of the system of Fig. 2 is identical to that shown in Fig. 1, the main difference being the modified field weakening arrangement to allow the control system to be applied to either compound or series type traction motors.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A control system for a prime mover driven electric generator connected to supply energy to a load circuit, an electric motor in said load circuit having a field winding, a separately energized field winding for said generator, control means operative over a portion of its range to progressively adjust the energization of said generator field winding while said motor field excitation is held constant and operative over the remainder of its range to adjust said motor field excitation while said generator field winding energization is held constant, and means responsive to variations in load on said prime mover for initiating operation of said control means to maintain the load on said prime mover substantially constant at a predetermined setting.

2. A control system for a prime mover driven electric generator connected to supply energy to a load circuit, an electric motor in said load circuit having a field winding, a separately energized field winding for said generator, an auxiliary source of excitation therefor, motor-operated variable resistance means operative over a portion of its range to progressively adjust the energization of said generator field winding while said motor field excitation is held constant and operative over the remainder of its range to adjust said motor field excitation while said generator field winding energization is held constant, and means responsive to variations in load on said prime mover for initiating operation of said motor-operated resistance means in a proper sense to maintain the load on said prime mover substantially constant at a predetermined setting.

3. A control system for a prime mover driven electric generator connected to supply energy to a load circuit, an electric motor in said load circuit having a series field winding and a separately excited field winding, a separately energized field winding for said generator, an auxiliary source of excitation current therefor, control means for successively adjusting the energization of said generator field winding while said motor field excitation is held constant and for adjusting the excitation of said separately excited motor field winding while said generator field winding energization is held constant, and means responsive to variations in load on said prime mover for initiating operation of said control means to maintain the load on said prime mover substantially constant at the predetermined setting.

4. A control system for a prime mover driven electric generator connected to supply energy to a load circuit, an electric motor in said load circuit having a series field winding and a separately excited field winding, a separately energized field winding for said generator, an auxiliary source of excitation current therefor, motor-operated rheostat means for successively adjusting the energization of said generator field winding while said motor field excitation is held constant and for adjusting said motor field excitation while said generator field winding energization is held constant, and means responsive to variations in load on said prime mover for initiating operation of said motor-operated rheostat means in a proper sense to maintain the load on said prime mover substantially constant at the predetermined setting.

5. A control system for a prime mover driven electric generator connected to supply energy to a load circuit, an electric motor in said load circuit having a series field winding and a separately energized field winding, a separately energized field winding for said generator, an auxiliary source of excitation current for said separately energized field winding, a motor-operated rheostat having a resistance element in series with each of said separately energized field windings for successively adjusting the energization of said generator field winding while said motor field excitation is held constant and for adjusting the excitation of said separately excited motor field winding while said generator field winding energization is held constant, and means responsive to variations in load on said prime mover for initiating operation of said motor-operated rheostate in a proper sense to maintain the load on said prime mover substantially constant at the predetermined setting.

6. A control system for a prime mover driven electric generator connected to supply energy to a load circuit, an electric motor in said load circuit having a series field winding, parallel resistance means for varying the current flow in said series field winding, a separately energized field winding for said generator, control means for successively adjusting the energization of said generator field winding while said motor field excitation is held constant and for adjusting said motor field excitation while said generator field winding energization is held constant, and means responsive to variations in load on said prime mover for initiating operation of said control means to maintain the load on said prime mover substantially constant at the predetermined setting.

7. A control system for a prime mover driven electric generator connected to supply energy to a load circuit, an electric motor in said load circuit having a series field winding, parallel resistance means for varying the current flow in said series field winding, a separately energized field winding for said generator, electromagnetic switching means in circuit with said parallel resistance means and said series field winding, a motor driven rheostat for successively adjusting the energization of said generator field winding while said motor field excitation is held constant and for energizing said switching means to vary motor field excitation while said generator field winding energization is held constant, and means responsive to variations in load on said prime mover for initiating operation of said motor driven rheostat to maintain the load on said prime mover substantially constant at the predetermined setting.

8. A control system for a prime mover driven electric generator connected to supply energy to a load circuit, an electric motor in said load circuit having a series field winding, a plurality of parallel resistances for varying the current flow in said series field winding, switching means in circuit with said parallel resistances, a separately energized field winding for said generator, an auxiliary source of excitation for said generator field winding, motor-operated control means for sequentially adjusting the energization of said generator field winding while said motor field excitation is held constant and for actuating said switching means to adjust said motor field excitation while said generator field winding energization is held constant, and means responsive to variations in load on said prime mover for initiating operation of said control means to maintain the load on said prime mover substantially constant at the predetermined setting.

GEORGE R. HIGGS.

REFERENCES CITED

The following references are of record in the file of this patent:

UNITED STATES PATENTS

| Number | Name | Date |
| --- | --- | --- |
| 2,281,844 | Jones | May 5, 1942 |
| 2,424,121 | Schlapfer | July 15, 1947 |
| 2,433,130 | Lassen | Dec. 23, 1947 |